(12) United States Patent
Ruess

(10) Patent No.: US 7,010,918 B2
(45) Date of Patent: Mar. 14, 2006

(54) INTERNAL COMBUSTION ENGINE WITH MOTOR BRAKE

(75) Inventor: Andreas Ruess, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/869,477

(22) Filed: Jun. 16, 2004

(65) Prior Publication Data

US 2005/0126169 A1    Jun. 16, 2005

(30) Foreign Application Priority Data

Jun. 17, 2003   (DE)   .................... P802821

(51) Int. Cl.
*F02G 3/00*      (2006.01)
*F02D 23/00*     (2006.01)
*F02B 33/44*     (2006.01)

(52) U.S. Cl. ............... 60/624; 60/602; 60/612; 415/158; 415/157

(58) Field of Classification Search ............ 60/602, 60/612, 614, 624; 415/157, 158, 144, 145, 415/146, 148, 167; 417/406–407
See application file for complete search history.

(56) References Cited

U.S. PATENT DOCUMENTS

| | | | |
|---|---|---|---|
| 1,038,977 A * | 9/1912 | Singrun | 415/158 |
| 3,075,742 A * | 1/1963 | Aldag | 415/158 |
| 4,586,336 A * | 5/1986 | Horler | 60/602 |
| 4,802,817 A * | 2/1989 | Tyler | 415/157 |
| 5,119,633 A * | 6/1992 | Brooks et al. | 60/624 |
| 5,855,117 A * | 1/1999 | Sumser et al. | 60/602 |
| 5,910,000 A * | 6/1999 | Schade et al. | 415/158 |
| 6,478,536 B1 * | 11/2002 | Doring et al. | 415/158 |
| 6,669,441 B1 * | 12/2003 | Bertnik et al. | 415/158 |
| 6,715,288 B1 * | 4/2004 | Engels et al. | 60/602 |
| 2003/0230085 A1 * | 12/2003 | Sumser et al. | 60/602 |

FOREIGN PATENT DOCUMENTS

| | | |
|---|---|---|
| DE | 43 38 115 | 5/1995 |
| DE | 100 28 733 | 12/2001 |
| EP | 0 477 579 | 2/1997 |

\* cited by examiner

*Primary Examiner*—Thai-Ba Trieu
(74) *Attorney, Agent, or Firm*—Klaus J. Bach

(57) ABSTRACT

In an internal combustion engine with a motor brake, includes an exhaust gas turbocharger and a power turbine disposed in the exhaust gas discharge line from the turbocharger for the conversion of the energy remaining in the exhaust gas into usable energy, the exhaust gas line includes bypass openings with a bypass line for the exhaust gas to by-pass the power turbine, and the turbine of the turbocharger includes inlet passages for the admission of the exhaust gas to the exhaust gas turbine, a slide-control member is supported by the exhaust gas line so as to be movable between an end position in which the turbine inlet openings are uncovered and an opposite end position in which the turbine inlet openings are covered and the by-pass openings of the power turbine are uncovered so that the exhaust gas can by-pass the power turbine.

3 Claims, 3 Drawing Sheets

INTERNAL COMBUSTION ENGINE WITH MOTOR BRAKE

BACKGROUND OF THE INVENTION

The invention relates to an internal combustion engine including a motor brake arrangement, with an exhaust gas turbocharger having an exhaust gas turbine arranged in the exhaust gas line of the engine and a compressor arranged in the fresh air supply line for the engine and, furthermore, downstream of the exhaust gas turbine, a power turbine which is coupled to the engine for transferring power to the engine.

EP 0 477 579 B1 discloses an internal combustion engine with a motor brake arrangement in the form of a compression brake. The internal combustion engine includes an exhaust gas turbocharger whose exhaust gas turbine is arranged in an exhaust gas duct and whose compressor is arranged in an air intake duct of the internal combustion engine. Downstream of the exhaust gas turbine, a power turbine is arranged in the exhaust duct which is driven by the exhaust gas and coupled to the engine by a transmission. The turbine housing of the exhaust gas turbine includes a turbine wheel and downstream of the turbine wheel an exhaust gas channel is provided to which the axial power turbine is connected. The exhaust gas channel includes a by-pass arrangement with an axially movable annular slide valve whereby the exhaust gas can be conducted around the power turbine.

The exhaust gas turbine drives the compressor by way of a common shaft. The compressor sucks in air, compresses the air and discharges the compressed air to the intake duct of the internal combustion engine. The exhaust gas of the turbine is first directed to the exhaust gas turbine of the exhaust gas turbocharger and then to the power turbine which transmits the energy remaining in the exhaust gas by way of the transmission to the engine. During motor brake operation, the fuel injection is de-activated and the compression brake is activated. The compression brake opens at the end of a compression stroke the exhaust valves of each cylinder for a short period. The air compressed in the combustion chamber then escapes into the exhaust gas duct. The internal combustion engine only compresses the air and therefore provides braking power. The braking power generated by the compression of the air depends on the air flow volume passing through the engine. The air flow volume can be increased by an increased pressure difference in the exhaust gas turbine. The pressure difference can be increased for example by decreasing the exhaust gas back pressure of the exhaust gas turbine. The downstream power turbine is actually a throttling device, which increases the exhaust gas back-pressure. In addition, the power turbine driven by the exhaust gas supplies power to the internal combustion engine. In order to lower the exhaust gas back pressure and to circumvent the power turbine the bypass arrangement is opened whereby the exhaust gas is conducted through the bypass line past the power turbine.

It is the object of the present invention to provide an internal combustion engine of the type described in the introductory part of the application, but wherein the air flow volume during braking operation is increased such that the braking power of the engine is substantially increased while the power turbine is by-passed.

SUMMARY OF THE INVENTION

In an internal combustion engine with a motor brake, wherein the engine includes an exhaust gas turbocharger and a power turbine disposed in the exhaust gas discharge line from the turbocharger for the conversion of the energy remaining in the exhaust gas into usable energy, the exhaust gas line extending between the turbine outlet of the turbocharger and the power turbine includes bypass openings with a bypass line for the exhaust gas to by-pass the power turbine and the turbine of the turbocharger includes inlet passages with turbine inlet openings for the admission of the exhaust gas to the exhaust gas turbine wheel, and a slide-control member is supported by the exhaust gas line so as to be movable between an end position in which the turbine inlet openings are uncovered and an opposite end position in which the turbine inlet openings are covered and the by-pass openings of the power turbine are uncovered so that the exhaust gas can by-pass the power turbine.

The exhaust gas turbine includes in a turbine housing a turbine wheel and an exhaust gas channel downstream of the turbine wheel. The turbine housing includes preferably two inlet passages for admitting the exhaust gas to the turbine wheel. The inlet passages have flow admission openings arranged at least in sections around the turbine wheel for directing the exhaust gas onto the turbine wheel. An annular axially movable slide member is provided in the exhaust channel, by which by-pass openings to a bypass conduit disposed annularly around the turbine outlet can be opened or closed. The slide member also forms a control element which is so designed that it can be moved also in front of the flow admission openings of the inlet passages of the exhaust gas turbine. During braking operation, the control element causes the exhaust gas flow speed onto the turbine wheel to increase so that the speed of the turbine wheel is increased. As a result, also the speed of the compressor increases whereby the charge air pressure is increased.

Consequently, the charge air flow volume and the filling degree of the cylinders are increased. In this way, the compression work and the engine braking power is increased. With the control element, also the slide member is moved such that, at the same time, the bypass opening is opened. The exhaust gas back pressure drops as the exhaust gas flows through the by-pass duct past the power turbine. The advantage of an internal combustion engine with a motor brake including such a control element resides in achieving an increase in the compression braking power in a simple manner.

In the arrangement according to the invention, the control element includes an annular slide member with a flow guide vane structure which is movable in front of the turbine inlet passages. With the annular flow guide vane structure, the flow of the exhaust gas can be controlled in predetermined ways. The annular flow guide structure deflects the exhaust gas flow in such a way that the speed of the exhaust gas flow is increased. In this way, the speed of the exhaust gas turbine and, together therewith, the speed of the compressor is increased.

In a particular embodiment of the invention, the control element and the annular slide member are a single component. The control element and the slide member may be firmly connected to each other or be formed integrally. The control element then takes on also the function of the slide member. The advantage of such an integral control element and slide member structure is that the control element and the slide element are coupled in a simple manner and their operation is synchronized. In addition, no separate control or operating mechanism is needed for the slide member.

An exemplary embodiment of the invention will be described below on the basis of the accompanying drawings.

DESCRIPTION OF A PREFERRED EMBODIMENT

Figure 1:
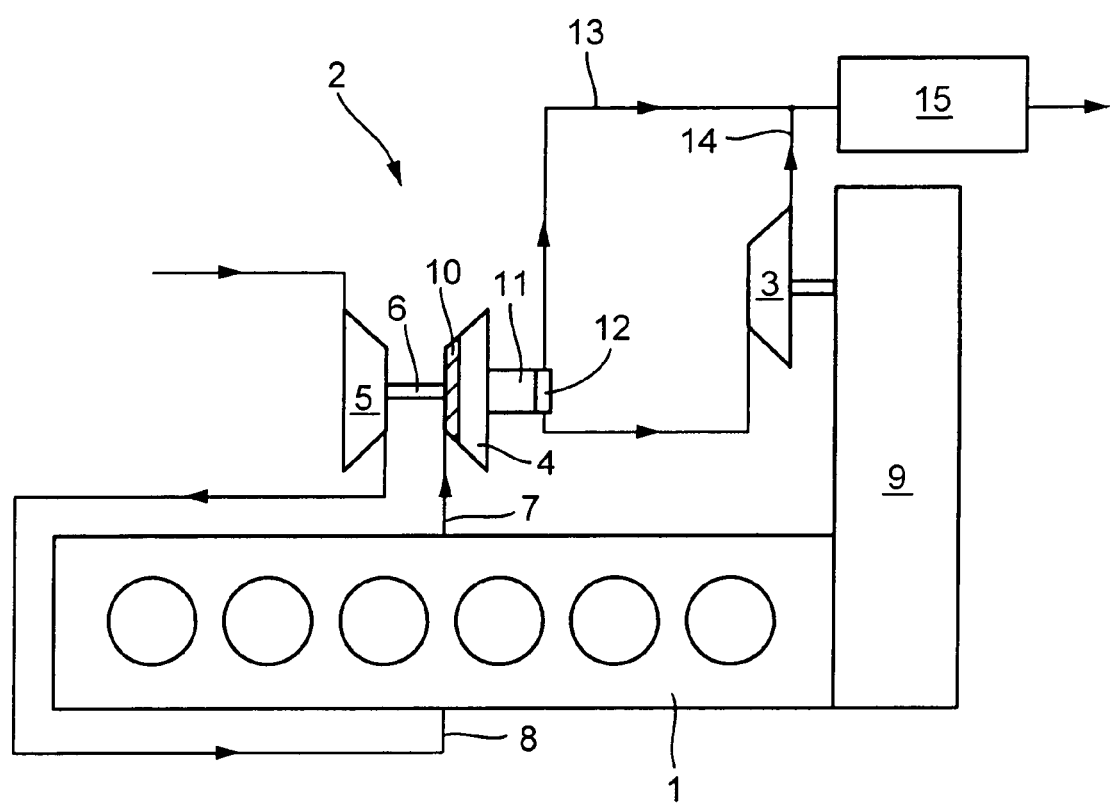
FIG. 1 shows schematically an internal combustion engine with a motor brake, an exhaust gas turbocharger and a power turbine.

FIG. 1 shows schematically an internal combustion engine 1 including a motor brake (not shown in FIG. 1) an exhaust gas turbocharger 2 and a power turbine 3. The motor brake is constructed in the form of a well known compression brake, preferably in the form of a constant throttle. The general design of such an arrangement is shown for example in DE 43 38 115 C2. The exhaust gas turbocharger 2 includes an exhaust gas turbine 4 and a compressor 5, which are interconnected by a common shaft 6. The exhaust gas turbine 4 is disposed in an exhaust gas duct 7 and the compressor 5 is disposed in an intake duct 8 of the internal combustion engine 1. The power turbine 3 is disposed downstream of the exhaust gas turbine 4 and is coupled to the internal combustion engine by a transmission 9. The exhaust gas turbine 4 includes a control element 10, by which the exhaust gas flow into the exhaust gas turbine 4 is adjustable in a known manner. The exhaust gas turbine 4 includes an exhaust gas passage 11 with a bypass arrangement 12. The exhaust gas passage 11 and the by-pass arrangement 12 may be separate parts or an integral component of the exhaust gas turbine. The by-pass arrangement 12 is disposed downstream of the turbine 4, or, respectively, a turbine wheel 17 shown in FIG. 2. The by-pass arrangement 12 permits the exhaust gas to by-pass the power turbine 3 and the main exhaust duct 14 at least partially by way of a by-pass line 13 leading directly to an exhaust system 15 of the internal combustion engine 1.

The exhaust gas of the internal combustion engine 1 flows through the exhaust gas duct 7 to the exhaust gas turbine 4. The exhaust gas turbine 4 utilizes the energy contained in the exhaust gas for driving the compressor 5. The compressor 5 sucks in air and supplies the compressed air to the intake duct 8 of the internal combustion engine 1.

Figure 2:
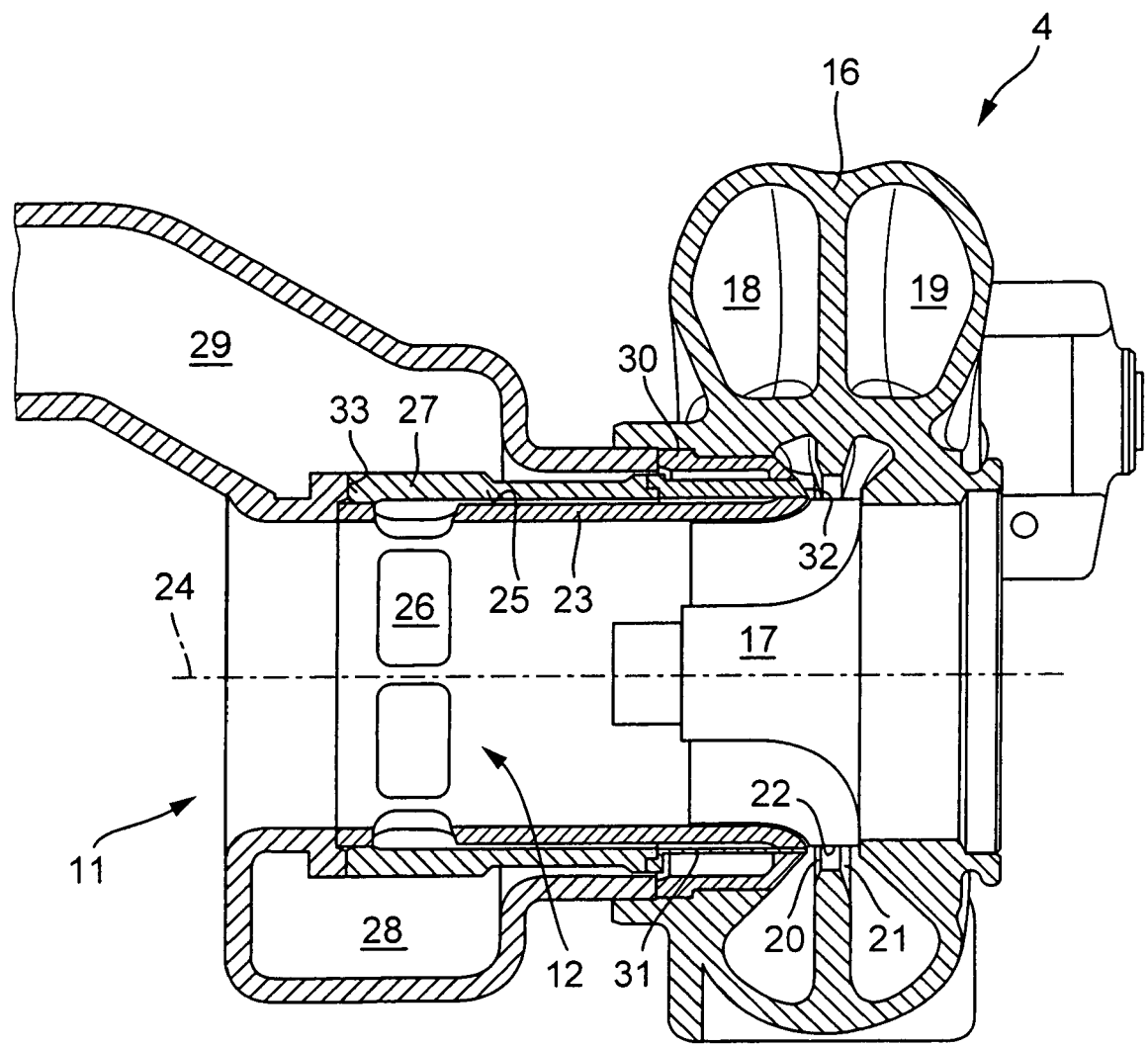
FIG. 2 is an axial cross-sectional view of an exhaust gas turbocharger with a control element according to the invention shown in a closed position.

During power operation, the internal combustion engine 1 takes in the pre-compressed air from the intake duct 8. The intake duct 8 may include a charge air cooler which is not shown. The pre-compressed air is compressed in the internal combustion engine 1 and mixed with fuel or fuel is mixed to the air before it is admitted to the internal combustion engine and the mixture is combusted in the engine. The exhaust gas generated by the combustion flows through the exhaust gas turbine 4. In an open position of the control element 10, the exhaust gas is conducted, unaffected by the control element 10 to the turbine wheel 17 as shown in FIG. 2 and is then discharged into the exhaust gas passage 11. The by-pass line 13 connected to the exhaust gas passage 11 is closed by the bypass arrangement 12 so that all the exhaust gas is conducted from the exhaust gas turbine 4 to the power turbine 3. In the power turbine 3, the energy remaining in the exhaust gas is extracted and transmitted to the internal combustion engine by way of the transmission 9.

During braking operation, the internal combustion engine 1 takes in pre-compressed air from the intake duct 8. The internal combustion engine 1 compresses the air but no fuel is mixed into the compressed air so that no combustion takes place. Instead, the compression brake opens a brake outlet valve so that the compressed air is discharged from the internal combustion engine 1 to the exhaust gas duct 7. The compression brake may comprise a constant throttle as it is shown for example in DE 43 38 115 C2. The braking power of the internal combustion engine is generated by the power which is needed by the internal combustion engine 1 to compress the air inducted into the engine, but which is not returned to the engine by decompression of the compressed air. The exhaust gas flows through the exhaust gas turbine, wherein the control element 10 is closed. In the closed position of the control element 10, the exhaust gas flow is deflected onto the turbine wheel in such a way that the speed of the exhaust gas turbine is increased. At the same time, the bypass line 13 is opened so that the exhaust gas flows at least partially through the bypass line 13 past the power turbine 3 and the power turbine is not driven and will not supply power to the internal combustion engine 1.

The braking power of a compression brake can be increased by a low exhaust gas back pressure and an increased air volume flow through the engine. By causing the exhaust gas to by-pass the power turbine 3, the exhaust gas back pressure is reduced since the throttle effect of the power turbine is eliminated. The pressure difference between exhaust gas ahead of the exhaust gas turbine 4 and after the exhaust gas turbine 4 is therefore increased and the speed of the exhaust gas turbine is increased. Furthermore, the power turbine 3 does not supply power to the internal combustion engine 1, which would counteract the braking power of the engine. By a coupling of the by-pass arrangement 12 with the control element 10 in accordance with the present invention, a further increase of the speed of the exhaust gas turbine 4 can be provided for in a simple manner. The by-pass arrangement 12 opens during braking operation the by-pass line 13 and at the same time the control element closes part of the turbine inlet passage in such a way that the speed of the exhaust gas directed onto the turbine wheel is increased. In this way, the speed of the exhaust gas turbine 4 is increased and consequently also the speed of the compressor 5, which is coupled by the shaft 6 to the turbine 4. The charge air pressure increases and more pre-compressed air is supplied to the internal combustion engine 1, which increases the compression work for the engine resulting in an increase in the braking power.

FIG. 2 is an axial cross-sectional view of an exhaust gas turbine 4 with a by-pass arrangement 12 including the control element 10 according to the invention in an open position. The exhaust gas turbine 4 includes a turbine housing 16 with two gas admission passages surrounding a turbine wheel 17. An integral part of the turbine housing 16 are the two axially spaced gas admission passages 18, 19, which have a radially spiral configuration and which have turbine inlet nozzles 20, 21, which surround the turbine wheel 17 concentrically almost over its whole circumference so that annular nozzle structures are disposed in front of the turbine wheel 17. The annular nozzles 20, 21 extend close to the turbine wheel inlet 22. The turbine wheel inlet 22 has a cylindrical circumferential shape. Downstream of the exhaust gas turbine 4, the exhaust gas passage 11 extends axially from the turbine wheel 17 and includes a housing sleeve 23, which is part of the bypass arrangement 12 and supports a slide member 27 with the control element 10. The housing sleeve 23 extends co-axially with the longitudinal axis 24 of the exhaust gas turbocharger 2. The sleeve 23 is so sized that the largest outside diameter of the housing sleeve 23 is larger than the diameter of the turbine wheel 22. Downstream of the turbine wheel 17, the housing sleeve 23 includes at its circumference 25 at least one bypass opening 26, preferably several bypass openings uniformly distributed over the circumference of the sleeve in an axially stationary position. The bypass openings may be round or rectangular as shown in the drawings. The bypass arrangement comprises the annular axially movable slide member 27 and an annular by-pass flow channel 28 with a connecting passage 29 leading to the by-pass line 13. The slide member 27 which extends co-axially to the longitudinal axis 24 of the turbine is supported on the housing sleeve 23 and, at least in the area of the bypass openings 26, is slightly spaced from the sleeve 23. During its axial control movement, the slide member 27 slides along the circumferential surface 25 of the housing sleeve 23. The wall of the by-pass flow channel 28 surrounds the slide member 27 and is connected at its upstream end to the housing 16 of the exhaust gas turbine 4. Its downstream end terminates with the sleeve 23. The slide member 27 is connected to the control element 10 which extends co-axially with the longitudinal axis 24 of the turbocharger and which is slidably supported with its upstream end on the outer circumferential surface 25 of the housing sleeve 23 so as to be guided during its control movements. The control element 10 may for example be a sleeve-like ring, which can be moved in front of the gas inlet openings 20, 21, such that the flow of the exhaust gas onto the turbine wheel 17 can be controlled. The design of such a control element 10 is well known to the person skilled in the art in the form of guide vane structures as they are shown for example in DE 100 28 733 A1. However, the invention is not limited to the use of axially movable guide vane structures but the variable turbine inlet flow guide geometry (VTG) may also be in the form of an annular rotatable slide member.

In accordance with the invention, the control element 10 takes on also the function of the slide member 27. Instead of providing a single element for the control element 10 (guide vane structure) and the slide member 27 two separate members may be provided which may have stepped abutting end portions which may be joined together by welding. The guide vane element 10 is further supported in a guide sleeve 30, which extends around the guide vane element 10 and on which the turbine housing 16 is mounted. The guide vanes 31 of the guide vane element 10 are guided in the guide sleeve 30. In the open position, the front end 32 of the guide vane element 10 extends to a corresponding end of the guide sleeve 30. By an operating mechanism, which is not shown but which is connected to the slide member 27 and which is disposed outside the gas turbine 4 and the exhaust gas passage 11, the guide vane element 10 and the slide member 27 can be operated by electric, pneumatic or hydraulic operating means. The axial length of the guide vane element 10 is about half the axial length of the slide member 27. In the open position of the guide vane element 10, wherein the exit openings 20, 21 are fully open, the slide member 27 is in a closed position. Then the slide member 27 abuts the stop 33 at its end opposite the turbine wheel. The exhaust gas then flows through the exhaust gas turbine 4 and the exhaust gas passage 11 to the power turbine 3.

Figure 3:
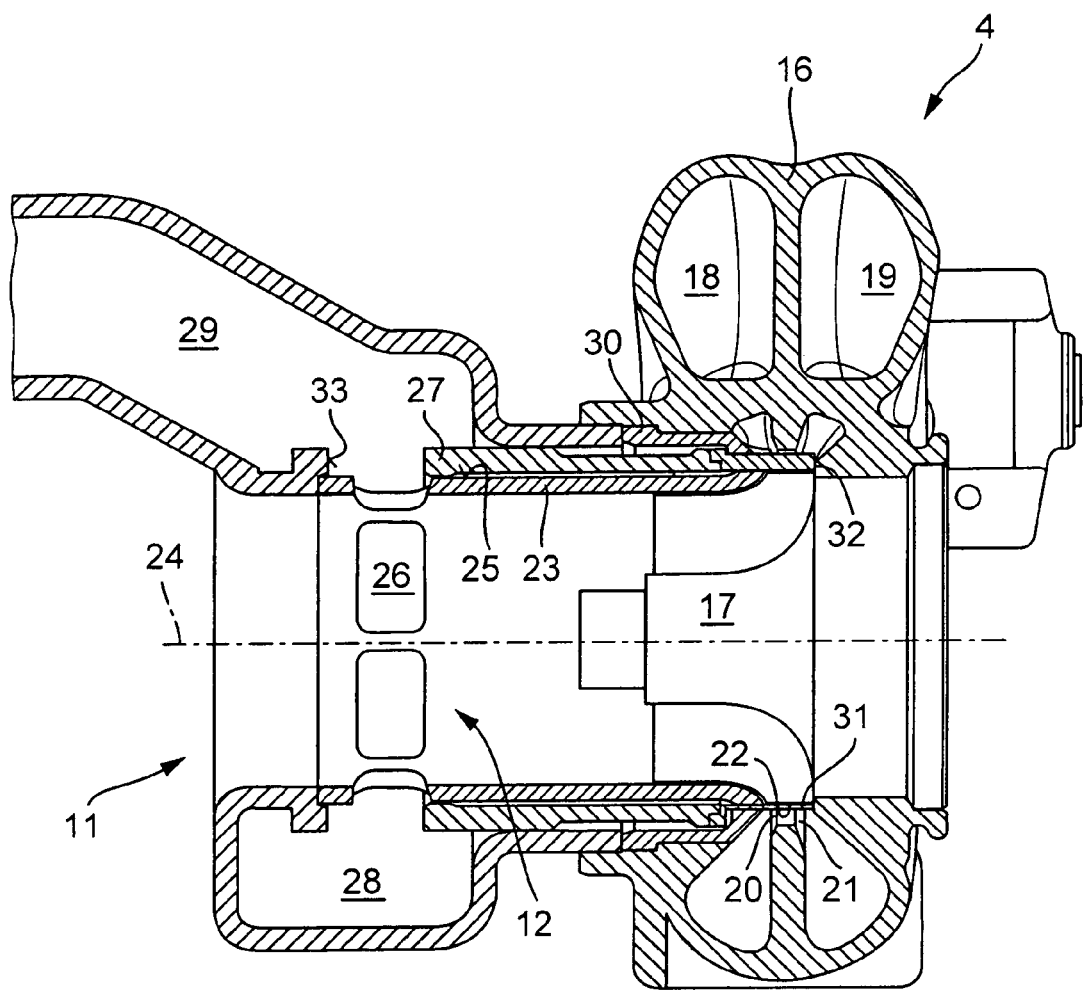
FIG. 3 shows an exhaust gas turbine of an exhaust gas with a control element according to the invention in a closed position.

FIG. 3 shows the control element 10 in a closed position. In FIG. 3, all the identical components are designated by the same reference numerals used in FIG. 2. During braking operation, the guide vane element 10 is closed and the slide member 27 is moved off the bypass openings 26. In the closed position of the guide vane element 10, the guide vanes 31 are disposed between the inlet openings 20, 21 of the exhaust gas turbine 4 and the turbine wheel inlet 22 to the turbine wheel 17 such that the inlet openings 20, 21 are covered by the guide vane structure. The guide vanes 31 then deflect the exhaust gas such that the speed of the exhaust gas flow onto the turbine wheel is increased. As a result, the speed of the exhaust gas turbine and also the speed of the compressor are increased.

What is claimed is:

1. An internal combustion engine (1) with an air intake duct (8) and an exhaust duct (7) and with a motor brake, including an exhaust gas turbocharger (2) having an exhaust gas turbine (4) disposed in said exhaust duct (7) and a compressor (5) disposed in said intake duct (8), said exhaust gas turbine (4) including a turbine wheel (17) and said compressor (5) including a compressor wheel, both being mounted on a common shaft such that said compressor (5) is driven by said exhaust gas turbine (4), said exhaust gas turbine (4) including a housing (16) enclosing the turbine wheel (17) and having at least one inlet flow passage (18, 19) with inlet openings (20, 21) disposed around the turbine wheel (17) and an exhaust gas passage (11) extending axially from said exhaust gas turbine (4) to a power turbine (3), which is coupled to said engine (1) for transferring power thereto, said exhaust gas passage (11) including bypass openings (26) and a bypass line (13) in communication with said by-pass openings (26) for conducting exhaust gas around said power turbine (3) and an axial slide member (27) supported by said exhaust passage (11) together with a control element (10), said axial slide member (27) and said control element (10) being movable jointly between two end positions, in one of which said axial slide member (27) covers and blocks said by-pass openings (26) and said inlet openings (20, 21) are uncovered by said control element (10) so as to reduce the backpressure of the exhaust gas turbine and in the other of which said control element extends over said inlet openings (20, 21) during engine power operation for partially closing the turbine inlet openings (20, 21) to increase the speed of the exhaust gas flowing onto the turbine wheel (17) thereby to increase the turbine and compressor speeds and the pressure of the combustion air supplied to the engine, but said bypass openings are uncovered so that the exhaust gas flow can bypass said power turbine (3).

2. The internal combustion engine according to claim 1, wherein said control element (10) includes an annular guide vane structure which covers said inlet openings (20, 21) when said control element (10) is in the other of said two end positions.

3. The internal combustion engine according to claim 1, wherein said control element (10) and said slide member (27) consist of a single component.

* * * * *